United States Patent [19]

Nelson

[11] 4,028,962

[45] June 14, 1977

[54] DESIGN AND CONSTRUCTION OF FLYWHEELS FROM ANISOTROPIC MATERIALS

[76] Inventor: Edwin B. Nelson, 1408 Georgia, N.E., Albuquerque, N. Mex. 87110

[22] Filed: Dec. 24, 1975

[21] Appl. No.: 644,420

[52] U.S. Cl. ................................................ 74/572
[51] Int. Cl.² ........................ G05G 1/00; G05G 3/00
[58] Field of Search ..................................... 74/572

[56] References Cited

UNITED STATES PATENTS 3,496,799  2/1970  Call ..................................... 74/572

*Primary Examiner*—Leonard H. Gerin

[57] ABSTRACT

This invention relates to the design and construction of the body of a flywheel from high strength anisotropic materials so as to provide maximum energy storage. The design is adaptable to fiber composite materials and allows the fibers to be oriented either radially or circumferentially in the body of the flywheel.

4 Claims, 4 Drawing Figures

DESIGN AND CONSTRUCTION OF FLYWHEELS FROM ANISOTROPIC MATERIALS

BACKGROUND

Many energy systems are adversely affected by the need to match a varying power output to a varying load. It is advantageous to be able to store excess energy produced when power output exceeds the demand and subsequently to use this stored energy during periods of peak demand. Flywheels are one method of storing energy. The energy stored in a flywheel is the kinetic energy of the spinning mass of the flywheel. The centripetal forces in a spinning flywheel induce radial and tangential stresses in the body of the fly-wheel. As the angular velocity of the flywheel increases, the stored energy and the induced stresses increase. The flywheel will fail when the induced stresses exceed the breaking strength of the flywheel material. Materials with high breaking strengths are therefore desirable for use in the construction of a flywheel. An object of this invention is to provide a method for the use of high strength materials in the construction of a flywheel.

The stresses induced in the body of a flywheel are not necessarily uniformly distributed through the material of the flywheel and the flywheel fails at that point where the stress is greatest even though the rest of the material may be relatively unstressed. Maximum specific energy (stored energy per unit mass) and energy density (stored energy per unit volume) are achieved when the entire body of the flywheel is stressed to its limit. An object of this invention is to provide methods of constructing a flywheel which permit all of the material in the body of the flywheel to be stressed to the limit.

Many high strength materials are in the form of fibers (e.g., fiberglass, carbon filaments). These materials are utilized by bonding together many filaments into a single body. Such materials are anisotropic in that they can sustain high stresses only along the axes of the filaments. In directions perpendicular to the filament axes the sustainable stress is that of the bonding material. To take advantage of such anisotropic materials in the construction of a flywheel it is necessary to control the stress distribution so that the maximum induced stresses are equal to the stress limits of the filaments and are oriented along the axes of the filaments, while stresses perpendicular to the filament axes are reduced to the limits of the bonding material. It is an object of this invention to provide methods of constructing a flywheel from anisotropic materials which provide such a stress distribution pattern.

DERIVATION OF FLYWHEEL SHAPE

The radial stress and tangential stress induced in the flywheel material are $\sigma_r$ and $\sigma_\theta$ respectively. The breaking strength of the flywheel material is $S_r$ in the radial direction and $S_\theta$ in the tangential direction. The angular velocity of the flywheel is $\omega$. The density of the flywheel material is $\rho$.

Figure 1:
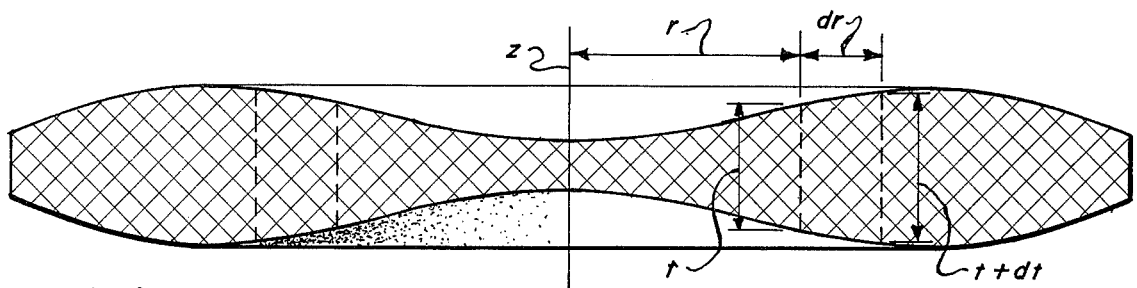
FIG. 1 is a cross-section through the axis of rotation of a flywheel. Cylindrical coordinates $r, \theta, z$ are used. The axis of rotation is the $z$ axis. Within the body of the flywheel a thin annulus is shown. The inner radius of the annulus is $r$. The outer radius is $r + dr$. The thickness at the inner radius is $t$. The thickness at the outer radius is $t + dt$.
Figure 2:
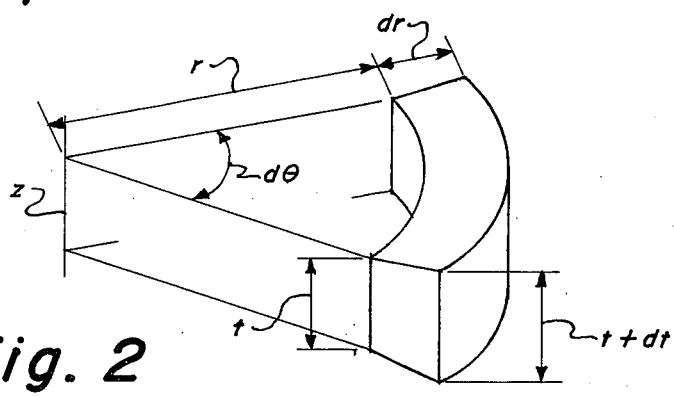
FIG. 2 is an isometric drawing of a differential element of the flywheel shown in FIG. 1. The element is a segment of the annulus described in FIG. 1. The differential element subtends an angle $d\theta$ at the $z$ axis. The arc length at the inner radius of the differential element is $r \, d\theta$. The arc length at the outer radius of the differential element is $(r + dr) \, d\theta$.

The forces acting on the differential element of the flywheel shown in FIG. 2 are:

a. The centripetal force; $t\rho\omega^2 r \, dr \, d\theta$.

b. The force on the inner face from radial stress; $\sigma_r r t \, d\theta$.

c. The force on the outer face from radial stress; $\sigma_r (r + dr) \, d\theta \, (t + dt)$.

d. The radial components of the forces on the end faces from tangential stress; $2 \, dr \, (t + \tfrac{1}{2} dt) \, \tfrac{1}{2} d\theta \, (t + dt)$.

e. The tangential components of the forces on the end faces are equal and opposed.

For dynamic equilibrium the sum of the forces acting on the element must be zero.

Setting the sum of the forces equal to zero and rearranging gives:

$$\frac{\rho \omega^2 r}{\sigma_r} + \frac{1}{r}\left(1 - \frac{\sigma_\theta}{\sigma_r}\right) dr + \frac{dt}{t} = 0 \tag{1}$$

Both $\sigma_r$ and $\sigma_\theta$ are assumed constant. The equation (1) can be integrated to give:

$$t = Cr^{\left(\frac{\sigma_\theta}{\sigma_r} - 1\right)} e^{-\left(\frac{\rho \omega^2 r^2}{2\sigma_r}\right)} \tag{2}$$

Where C is a constant of integration. If $\omega_0$ is the angular velocity at which the induced stresses $\sigma_\theta$ equal the breaking stresses, $S_r$ and $S_\theta$, respectively of the flywheel material, then the thickness, $t$, of the flywheel is defined by:

$$t = Cr^{\left(\frac{S_\theta}{S_r} - 1\right)} e^{-\left(\frac{\rho \omega_0^2 r^2}{2 S_r}\right)} \tag{3}$$

For the sake of simplicity set $$m = \tfrac{1}{2}\left(\frac{S_\theta}{S_r} - 1\right) \text{ and } \alpha^2 = \frac{\rho \omega_0^2}{2 S_r}$$

then equation (3) becomes:

$$t = Cr^{2m} e^{-\alpha^2 r^2} \tag{4}$$

From equation (4) the moment of inertia (I) and the mass (M) can be calculated:

$$I = \pi \rho C \alpha^{-2m+2)} [\gamma(m + 2, \alpha^2 r_o^2) - \gamma(m + 2, \alpha^2 r_i^2)] \tag{5}$$

$$M = \pi \rho C \alpha^{-2m+1)}[\gamma(m + 1, \alpha^2 r_o^2) - \gamma(m + 1, \alpha^2 r_i^2)] \tag{6}$$

where $r_i$ is the inner radius, $r_o$ is the outer radius and $\gamma(a, x)$ represents the Incomplete Gamma Function (see paragraph 6.5.2 (page 260) of the *Handbook of Mathematical Functions*, Abramowitz and Stegun, Dover, 1965).

In the theoretical case $r_i = 0$ and $r_o = \infty$ the specific energy $$(E/M) \text{ is } \frac{S_\theta + S_r}{2\rho},$$

and the energy density $$(E/V) \text{ is } \frac{S_\theta + S_r}{2}$$

APPLICATION TO FLYWHEEL CONSTRUCTION: Two cases must be distinguished: the "circumferential case" in which the high strength axis of the anisotropic material is oriented circumferentially about the axis of the flywheel, and the "diametrical case" in which the high strength axis is oriented radially through the axis of the flywheel.

Figure 3:
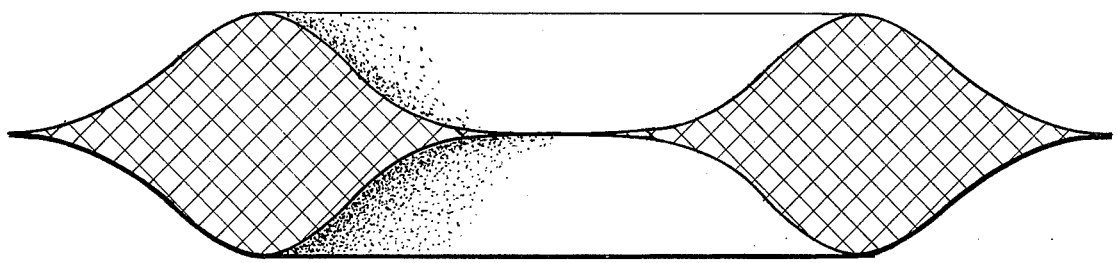
FIG. 3 is a cross-section through the axis of rotation of a flywheel of the circumferential type.

In the circumferential case $S_\theta$ is greater than $S_r$ and the parameter $m$ has the range, $0 < m < \infty$. The thickness of a circumferential flywheel has a maximum, at $r = \sqrt{m/\alpha}$. If the thickness is set at the value $t_m$ at this radius then the constant C will have the value $t_m \alpha^{2m} e^{m-m^{-m}}$. A typical cross section for a flywheel of this type is shown in FIG. 3. A circumferential flywheel can be constructed by winding the fibers into a form of the correct dimensions or by matching the outer surface to the correct dimensions.

Figure 4:
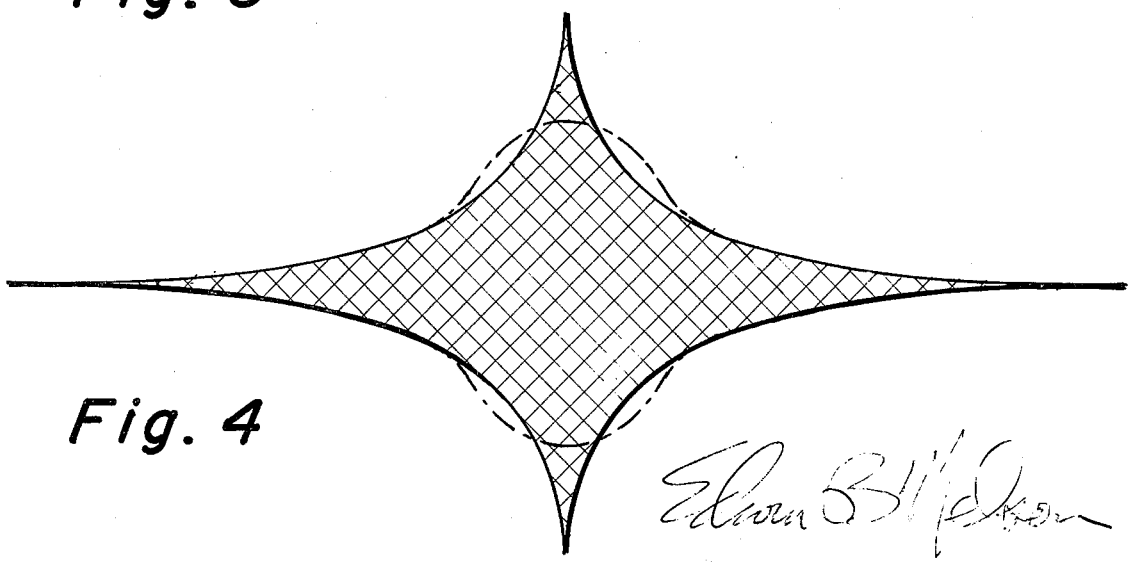
FIG. 4 is a cross-section through the axis of rotation of a flywheel of the diametrical type.

In the diametrical case the parameter $m$ has the range $-1 < m < 0$. Theoretically the thickness $t$ goes to infinity as $r$ goes to zero. If the thickness is set at $t_o$ at the outer radius $r_o$ then the constant C has the value $t_o r_o^{-2m} e^{\alpha^2 r^2 o}$. A typical cross-section of a flywheel of this type is shown in FIG. 4. In practice the thickness cannot diverge to infinity at the center of the flywheel; the dashed line indicates an estimate of the actual contour. A flywheel of the diametrical type can be constructed by laying filaments diametrically across a circle of radius $r_o$ and bonding into a unit. The correct contour can be achieved by building up the thickness of the disc in excess of the desired final contour and then machining away the excess to obtain the correct contour. Some of the filaments can be layed as chords to the outer perimeter. By varying the number and length of these chord-filaments a degree of control can be achieved over the cross-section thickness. The filaments can be bonded into the flywheel body in the form of flat strips of tape. By varying the number and width of the strips and by tapering the width of the strips from the center toward the rim, some control can be achieved over the thickness contour of the flywheel.

A diametrical flywheel can be constructed with an inner radius, $r_i$, by laying all the filaments or filament tapes as chords with a length equal to or less than the length of that chord tangent to the inner circle of radius $r_i$. The central hole of radius $r_i$ will provide for the insertion of an axle for the flywheel.

In machining the diametrical flywheel care must be taken that no filaments are incorporated in the body of the flywheel which have been severed in the middle since this would weaken the structure.

What is claimed is:

1. An energy storing flywheel comprised of a body of anisotropic material shaped symmetrically about a central axis of rotation, and in which:
   a. the major strength axes of the anisotropic material are oriented circumferentially about the central axis of rotation.
   b. the minor strength axes of the anisotropic material are oriented perpendicularly to the central axis of rotation, (i.e., radially).
   c. the thickness of the body of anisotropic material is defined by the formula:

$$t = C\, r^{2m} e^{-\alpha^2 r^2}$$

wherein:

$$C = t_m \alpha^{2m} e^m m^{-m}$$

$$m = \frac{1}{2}\left(\frac{S_\theta}{S_r} - 1\right)$$

$$\alpha^2 = \frac{\rho \omega_o^2}{2 S_r}$$

$t =$ the thickness of the body of anisotropic material measured parallel to and at a distance $r$ from the central axis of rotation.
   $r =$ the radial distance measured perpendicularly from the axis of rotation, at which distance the thickness of the flywheel is equal to $t$.
   $e =$ the base of "natural" logarithms with the approximate value 2.71828.
   $S_\theta =$ the maximum allowable unit tensile stress in the circumferential direction of the anisotropic material of which the flywheel is composed, with $S_\theta$ having a larger value than $S_r$.
   $S_r =$ the maximum allowable unit tensile stress in the radial direction of the anisotropic material of which the flywheel is composed, with $S_r$ having a lesser value than $S_\theta$.
   $\rho =$ the density of the anisotropic material of which the flywheel is composed.
   $\omega_o =$ the angular velocity sufficient to induce the stresses $S_\theta$ and $S_r$ throughout the body of anisotropic material.
   $t_m =$ the maximum thickness of the flywheel, which occurs at the radium $r_m = \sqrt{m/\alpha}$.

2. The structure set forth in claim 1 above, wherein the anisotropic material of which the structure is made, is selected from those fiber-composite materials having a high ratio of maximum allowable tensile stress to density (greater than 100,000 joules per kilogram) and which is constructed in the following steps:
   a. wind the fibers about a central axle to build up a roughly disc shaped body with a maximum radius at least as large as the outer radius ($r_o$) of the desired flywheel, and of a thickness at least as great as the maximum thickness ($t_m$) of the desired flywheel.
   b. impregnate the fiber disc with a bonding material (this step can be performed simultaneously with step a above).
   c. cure the bonding agent to obtain a solid fiber-composite disc.
   d. machine away the excess material to achieve the thickness dimensions described in claim 1 above, and a maximum radius of $r_o$.

3. An energy storing flywheel comprised of a body of anisotropic material shaped symmetrically about a central axis of rotation, and in which:
   a. The major strength axes of the anisotropic material are oriented perpendicularly to the central axis of rotation, that is, radially.
   b. the minor strength axes of the anisotropic material are oriented circumferentially to the central axis of rotation.
   c. the thickness of the solid body of anisotropic material is defined by the formula:

$$t = C\, r^{2m}\, e^{-\alpha^2 r^2}$$

wherein:

$$C = t_o\, r_o^{-2m}\, e^{-\alpha^2 r_o^2}$$

$$m = \frac{1}{2}\left(\frac{S_\theta}{S_r} - 1\right)$$

$$\alpha^2 = \frac{\rho \omega_o^2}{2 S_r}$$

$t$ = the thickness of the solid body of anisotropic material measure parallel to and at a distance $r$ from the central axis of rotation.

$r$ = the radial distance measured perpendicularly from the central axis of rotation, at which distance the thickness of the flywheel is equal to $t$.

$e$ = the base of "natural" logarithms with the approximate value 2.71828.

$S_\theta$ = the maximum allowable unit tensile stress in the radial direction of the anisotropic material of which the flywheel is composed, with $S_r$ having a greater value than $S_\theta$.

$\rho$ = the density of the anisotropic material of which the flywheel is composed.

$\omega_o$ = the angular velocity sufficient to induce the stresses $S_\theta$ and $S_r$ throughout the body of anisotropic material.

$r_o$ = the maximum radial dimension of the flywheel.

$t_o$ = the minimum thickness of the flywheel, which occurs at the maximum radius, $r_o$.

4. The structure set forth in claim 3 above, wherein the anisotropic material of which the structure is made, is selected from those fiber-composite materials having a high ratio of maximum allowable tensile stress to density (greater than 100,000 joules per kilogram), and which is constructed in the following steps:
   a. lay the fibers as diameters and chords across a circle of radius $r_o$, the outer radius of the desired flywheel, to build up a discus shaped body of fibers which everywhere has a thickness greater than the thickness ($t$) described in claim 2 above except for a central region of radius less than $r_i$, where the thickness will be less than the thickness ($t$).
   b. impregnate the discus shaped body of fiber with a bonding material (this step can be performed simultaneously with step a above).
   c. cure the bonding agent to obtain a solid fiber-composite discus shaped body.
   d. machine away the excess material in the region between radius $r_i$ and radius $r_o$ to achieve within that region the thickness dimension described in claim 2 above.
   e. cut off all material beyond radius $r_o$.

* * * * *